US008261426B2

(12) United States Patent
Fowler

(10) Patent No.: US 8,261,426 B2
(45) Date of Patent: Sep. 11, 2012

(54) METHOD OF CONSTRUCTING A TONER DISPENSING UNIT

(75) Inventor: Jeffrey M Fowler, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 217 days.

(21) Appl. No.: 12/859,984

(22) Filed: Aug. 20, 2010

(65) Prior Publication Data

US 2012/0042504 A1 Feb. 23, 2012

(51) Int. Cl.
*B21D 51/00* (2006.01)
*B29C 49/00* (2006.01)

(52) U.S. Cl. ........ 29/527.1; 264/523; 399/258; 399/120

(58) Field of Classification Search ................. 29/527.1; 264/423, 454; 399/258, 120; 425/525
See application file for complete search history.

(56) References Cited

U.S. PATENT DOCUMENTS 4,233,022 A * 11/1980 Brady et al. .................. 425/525
6,256,470 B1 * 7/2001 Taniyama et al. ............. 399/262
6,259,877 B1 * 7/2001 Taniyama et al. ............. 399/262
6,370,349 B2 * 4/2002 Tsuji et al. .................... 399/262
6,505,006 B1 1/2003 Solanki et al.
6,701,112 B2 * 3/2004 Kusano et al. ................ 399/262
6,785,497 B1 * 8/2004 Hasebe ......................... 399/260
7,672,609 B2 3/2010 Koyama et al.
7,676,183 B2 3/2010 Kimura et al.
7,713,055 B2 5/2010 Janeczek
7,713,603 B2 5/2010 Farran et al.
7,720,416 B2 5/2010 Taguchi et al.
2004/0022559 A1 * 2/2004 Kusano et al. ................ 399/262

* cited by examiner

*Primary Examiner* — Jermie Cozart

(74) *Attorney, Agent, or Firm* — Ronald E. Prass, Jr.; Prass LLP

(57) ABSTRACT

This is a toner-dispensing unit using a blow-molded, one-piece toner bottle with integral tabs. The tabs are uniquely designed so that they can only be used with specific marking machines. The tabs fit into mating slots in a drive dog so that installation, while usually a blind installation of bottles, is easily accomplished. The one-piece, blow-molded bottle with integral tabs used with mating slots in a drive dog provides an improvement over prior used toner-dispensing units.

14 Claims, 5 Drawing Sheets

METHOD OF CONSTRUCTING A TONER DISPENSING UNIT

This invention relates to an electrophotography system and, more specifically, to a novel replaceable toner bottle and toner dispensing unit used in said system.

BACKGROUND

In a typical electrophotographic marking process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material is made from toner particles adhering triboelectrically to carrier granules. The toner particles are attracted from the carrier granules to the latent image forming a toner powder image on the photoconductive member. The toner powder image is then transferred from the photoconductive member to a copy sheet. Heat is applied to the toner particles to permanently affix the powder image to the copy sheet.

The toner used in this marking process is generally supplied in bottles or cartridges where the replenisher bottle fits on a drive dog which rotates the bottle as toner is being fed from the bottle into a developer housing where it is mixed with carrier ready to be applied to a latent image to form the visible image that is eventually transferred to paper or other media. This general process is described in several patents including U.S. Pat. No. 6,505,006B1; U.S. Pat. No. 7,672,609; U.S. Pat. No. 7,676,183B2 and U.S. Pat. No. 7,720,416B2 all of which are incorporated by reference into the present invention.

The prior art bottles used in today's machines generally have two plastic parts assembled together, one portion (main body) is blow molded and the second part or end cap is an injected-molded component that is welded onto the blow-molded main body of the bottle. This end cap provides the means to drive the bottle and auger.

A rotating replenisher bottle with an integrated external auger is a low cost container for dispensing replenisher without relying on gravity feed. Prior art family drive such as a bottle with a round lobed feature on the bottle that fits into a similarly shaped cavity an a drive dog but, as noted, the feature is incompatible with the blow-molding process so an injection molded cap incorporating the feature is bonded to a blow-molded body section. The addition of an injection-molded part contributes significantly to the cost of the bottle. In designs not employing a mating drive interface as described above but rather a general or universal type drive interface, if the wrong type of toner is inserted, the bottle will still be driven and the system contaminated. What is desired is a low cost design that will drive only bottles with the appropriate toner type as encoded by the shape of a feature on the bottle.

SUMMARY

This invention provides a design for a 100% blow-molded bottle of a specific desired shape simultaneously while achieving the selective function of the prior art design and a cost advantage over the prior art design. The design features of the present invention comprise a plurality of shaped slots in the drive dog into which only tabs on the bottle of a specific shape will fit. Since the bottle-drive interface is situated deep inside the machine, the bottle must be inserted blind such that the drive connection is made smoothly and reliably. Blow-molding is an art and procedure known and used extensively, such as blow-molding procedure disclosed in U.S. Pat. Nos. 7,713,055 B2 and 7,713,603 B2. These two patents are incorporated by reference into the present disclosure.

This invention provides a simpler, less expensive method of manufacturing toner bottles and constructing a toner-dispensing unit. As earlier noted, the current bottle has two plastic parts assembled together. One portion is a blow-molded bottle shape. The second is an injection-molded component that gets welded onto the blow-molded bottle. This molded portion contains the key to drive the assembly. The present invention provides a bottle with the means both to drive the bottle and auger and to prevent the usage of an incorrect bottle, and the present invention can be manufactured in one piece via compression blow molding. The design of the end of the bottle that engages the machine is unique to each product and toner and can only be used in the correct machine in the correct location/color. The design employs drive dogs that interlock with the drive gear on the machine side allowing in one embodiment 12 positions in which to engage the bottle. Compression blow molding is used to construct the body of the bottle, then the insertion-end or nozzle portion of the bottle undergoes compression molding to form the drive dogs.

DETAILED DISCUSSION OF DRAWINGS AND PREFERRED EMBODIMENTS

Figure 1:
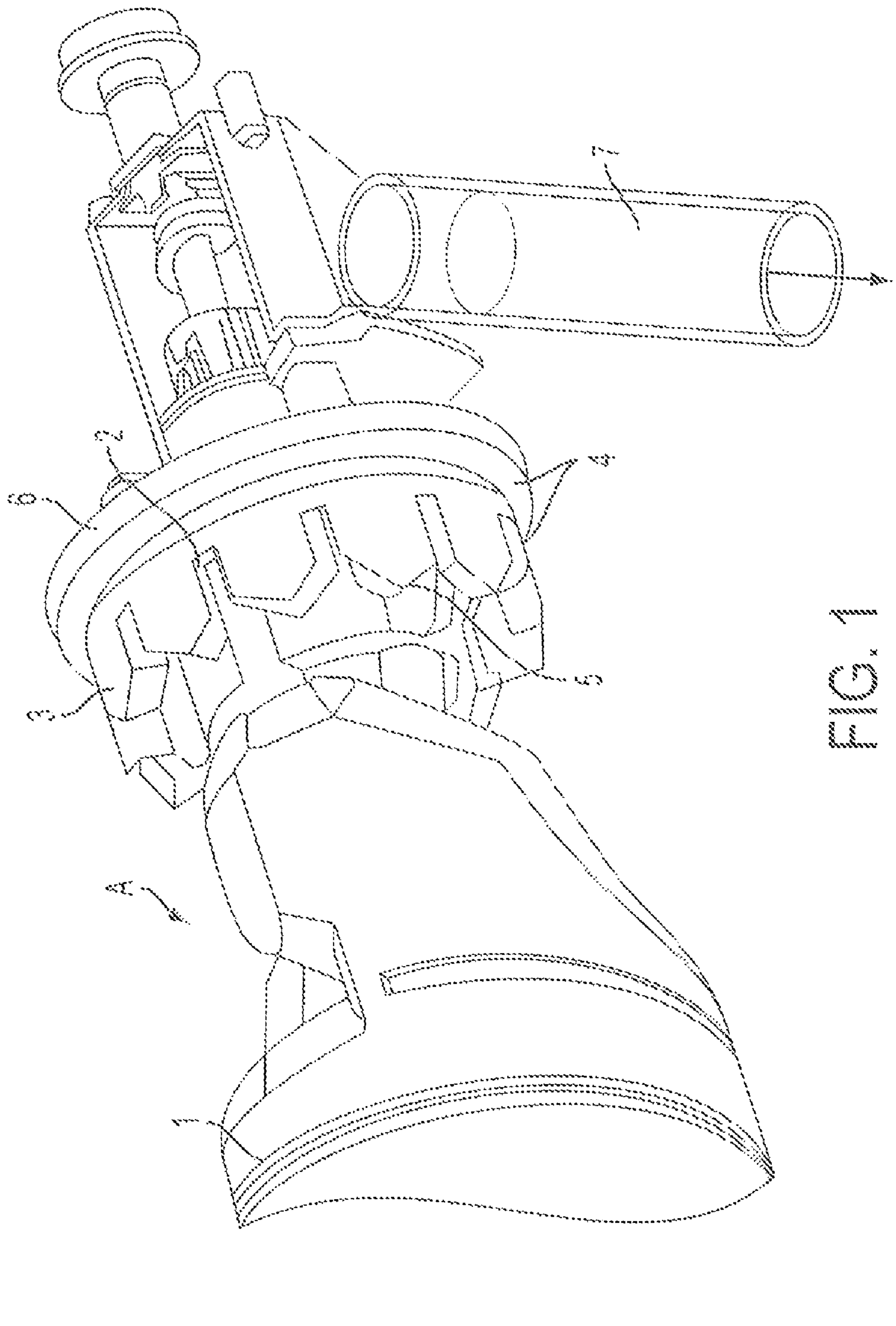
FIG. 1 is a perspective view of an embodiment of the toner-dispensing unit of this invention.

In FIG. 1, the bottle 1 is blow molded in the shape shown with compression-molded tabs 2. the tabs 2 have a specific shape. In this case, they have a bend at a particular angle; see FIG. 2. The drive dog 3 has slots 4 in the mating shape with an even rotational symmetry. Each slot 4 has lead-in chamfers 5. In the embodiment shown, the drive dog 3 has 12-fold rotational symmetry so the bottle 1 may locate to any of 12 orientations separated by 30°. As such, the bottle 1 is not required to rotate by more than 15° to locate. Care must be taken to design the lead-in chamfers 5 appropriately. Self-location should be easy but drive tabs of the wrong shape should ride over the chamfers 5 resulting in minimal drive.

Figure 5:
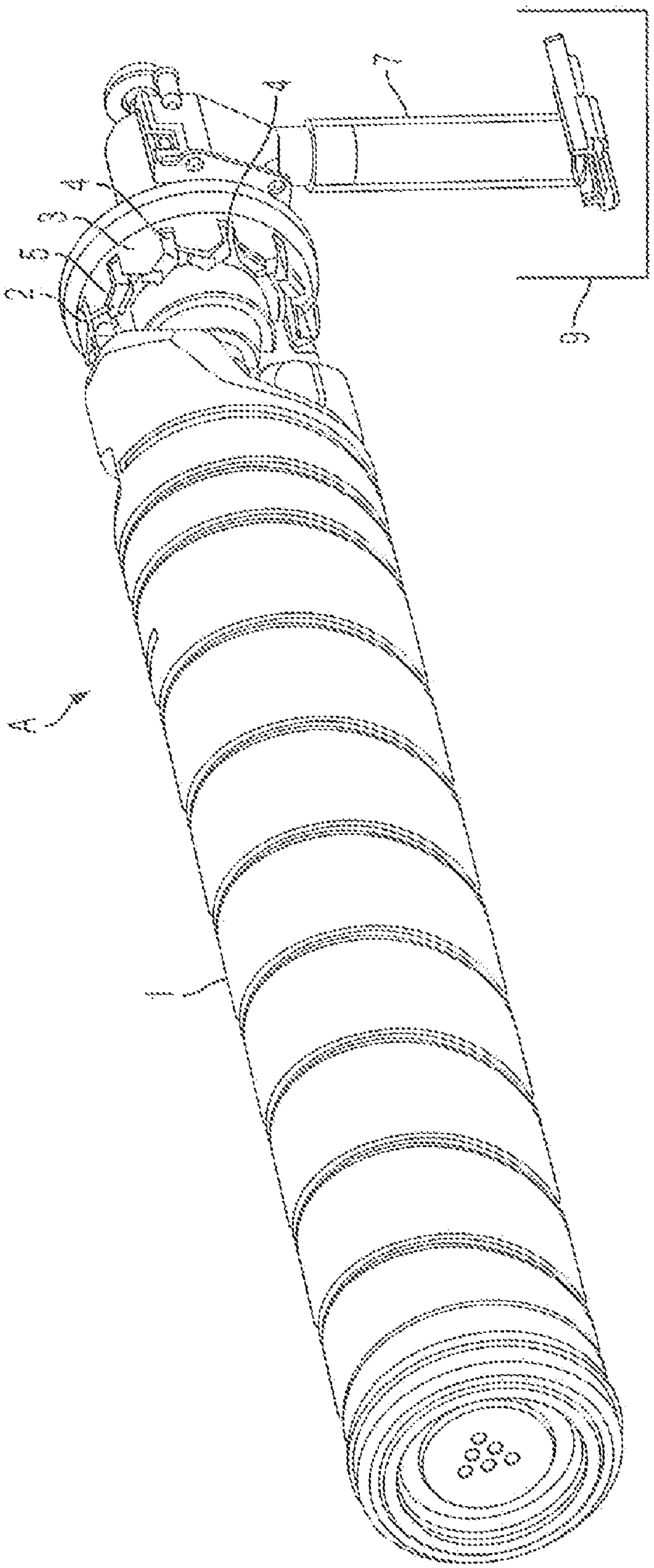
FIG. 5 is a perspective view of the toner-dispensing unit of this invention where the tabs have been inserted into the drive dog.

Bottle 1 is engaged with drive dog 3 in FIG. 5. The round feature 6 behind the drive dog 3 is a gear transmitting power from the gear train to the drive dog 3. Once the bottle 1 is engaged with the drive dog 3, the toner in the bottle 1 is transported from the bottle 1 to the drop tube 7 where the toner is deposited in a developer housing (not shown) where it is mixed with carrier.

Figure 2:
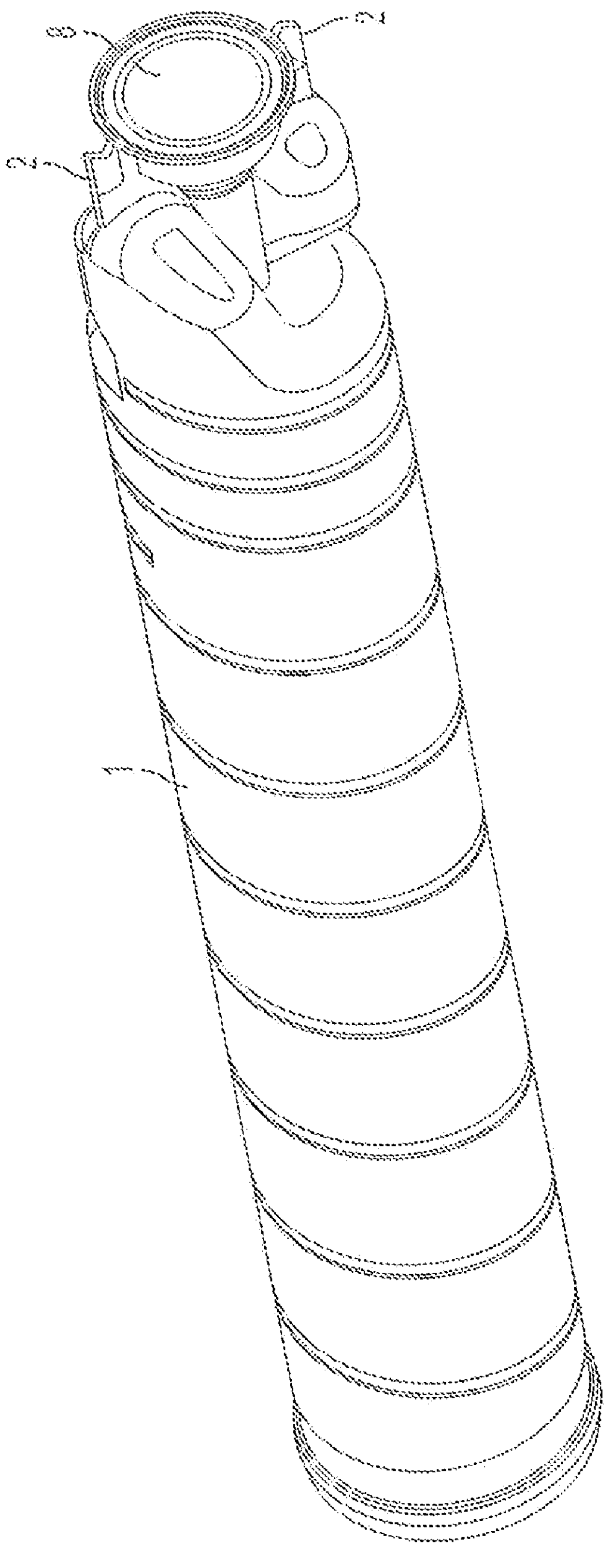
FIG. 2 is a perspective view of an embodiment of the one-piece, blow-molded toner bottle of this invention with integral tabs.
Figure 3:
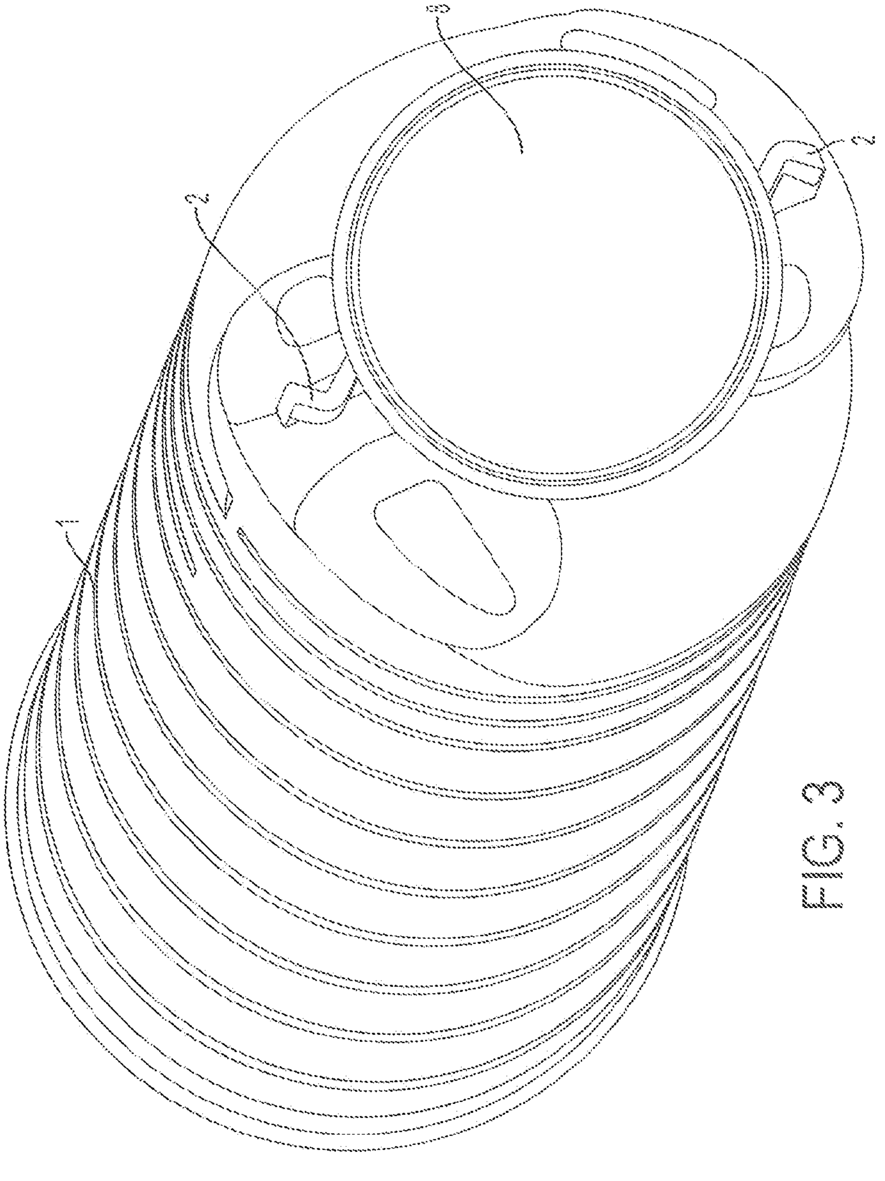
FIG. 3 is a perspective view of the insertion end of an embodiment which has two unique designed tabs.

In FIGS. 2 and 3, the one-piece, blow-molded bottle 1 of this invention is shown with unique integral tabs 2 at its insertion end. A sealing element 8 is located at the toner discharge port where the toner moves through the system, out drop tube 7 and into a developer housing 9 (see FIGS. 4 and 5). The tabs 2 are uniquely configured to mate with slots 4 in the drive dog 3 so that the bottle 1 can only be used in a desired marking system with appropriate tabs 2 and slots 4. In this embodiment, tabs 2 have a specific shape. They have a bend at a particular angle. The drive dog 3 has slots 4 in the mating shape to the tabs 2. Any suitable shape tabs 2 may be used as long as they mate with the slots 4; they may be round or straight angled as shown in FIG. 1.

Figure 4:
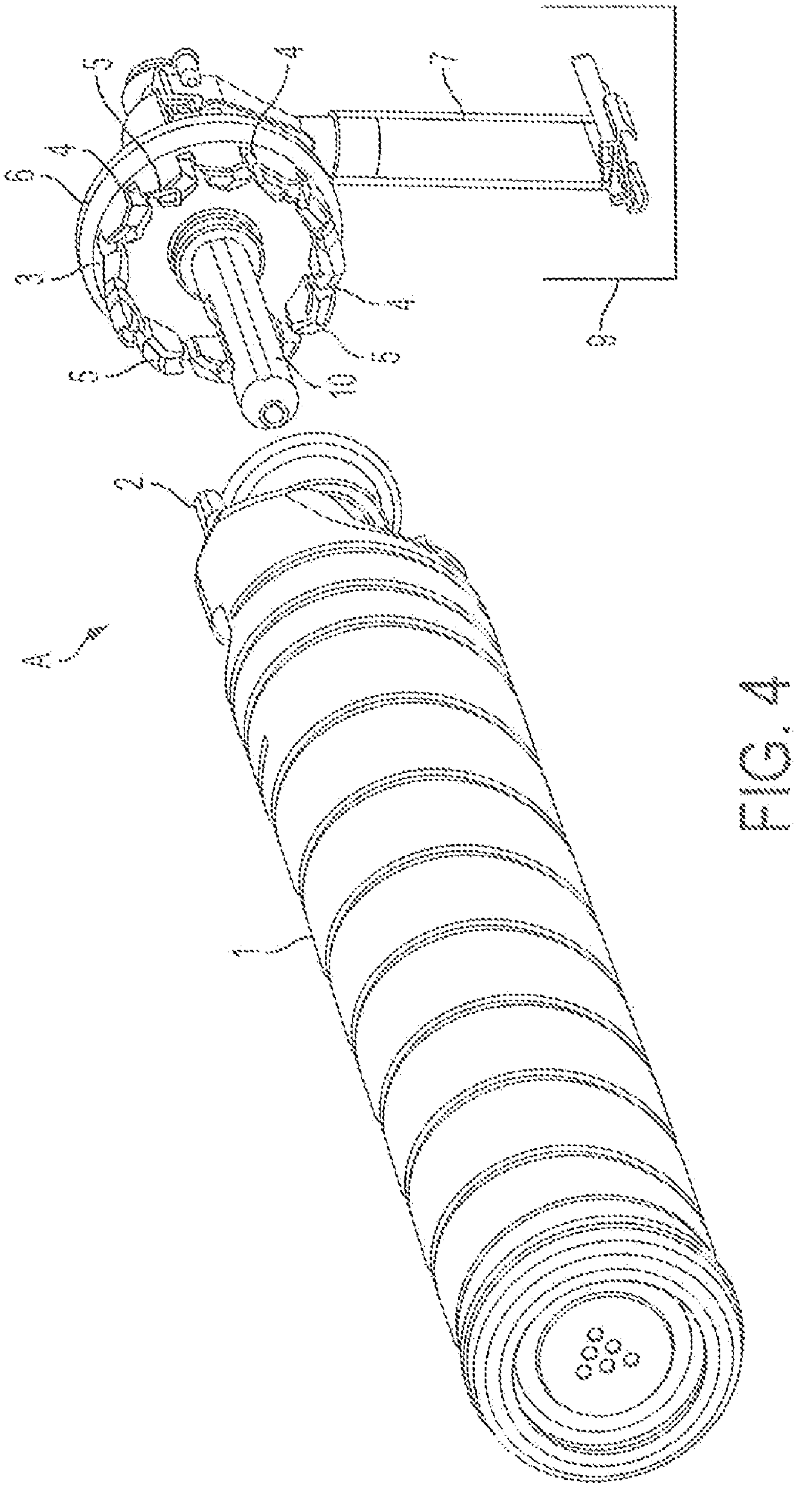
FIG. 4 is a perspective view of the toner-dispensing unit of this invention where the blow-molded bottle is about to be inserted into the drive dog.

In FIGS. 4 and 5, the blow-molded bottle 1 is shown before and after it engages drive dog 3. The tabs 2 must be configured to mate with slots 4 or the bottle 1 cannot be used with the specific marking machine. The toner is transported through the sealing element 8 (see FIG. 3) through probe rod 10, through drop tube 7 and finally into a developer housing 9 where it is mixed with carrier. The toner-dispensing unit A features a plurality of shaped slots 4 in the drive dog 3 into which only tabs 2 of a specific shape will fit. Since the bottle 1 drive interface is situated deep inside the marking machine, the bottle 1 must be inserted blind such that the drive connection is made smoothly and reliably.

In summary, this invention provides a method of constructing a toner-dispensing unit which comprises blow molding a one-piece toner bottle container, the bottle having integral therewith at least two molded tabs. These tabs are integral with a main molded body of the bottle and are molded into a specific shape with unique tabs for each product machine series. A drive dog is provided having a plurality of mating slots with lead-in chamfers, and these chamfers and slots are configured to mate with the unique tabs. The toner bottle is then mated with slots of the drive dog by engaging the unique tabs into the chamfers. The unique tabs are positioned on an insertion end of the toner bottle container that engages the drive dog. In one embodiment at least two molded tabs and each of the mating slots and chamfers are configured to be unique for each specific product machine; thus, the bottle will not fit in engagement with other products than the specific product intended. In an embodiment there are from 6-12 slots with lead-in chamfers in the drive dogs configured so that the bottle is not required to rotate more than about 15°-30° to locate in the slots when blindly installed therein. In a preferred embodiment the drive dog has 12 slots and the toner bottle has 2 tabs, and each of the tabs and the slots are configured to mate with each other. The bottle has a sealing element that seals an insertion-end toner discharge port; this element is located at an insertion-end terminal portion of the bottle. The sealing element is configured to be pierced so that the toner may flow out of the bottle through the toner dispensing unit. At least two molded tabs are positioned along a circumference of the sealing element that is positioned in an insertion-end portion of the toner bottle. In another embodiment of the method for making a toner dispensing unit the method comprises:

blow molding a one-piece toner container bottle, this bottle having integral therewith at least two molded tabs. These tabs are uniquely molded into a specific shape to be useful only in a specific marking product machine series; this is important to the invention. Unique tabs are positioned on an insertion end of the bottle where they are placed along an outer portion of the circumference of an adjacent sealing element. This sealing element is provided in assembly with the one-piece toner bottle and is configured to be punctured to permit toner flow therethrough from the bottle.

A drive dog is provided having a plurality of lead-in mating chamfers and mating slots, the slots configured to mate only with the unique tabs to accommodate only a specific marking product series. This is to avoid the problems of contamination with incompatible toner which are encountered in the prior art where general or universal type tabs and slots are used. The tabs are mated to the slots of the drive dog in a manner whereby toner will flow from the bottle, through an opening in the drive dog, to a drop tube that opens into a developer housing.

As earlier noted, the method preferred uses from 6-12 slots with lead-in chamfers in the drive dogs that are configured so that said bottle is not required to rotate more than about 15°-30° to locate in the slots when installed therein.

The sealing element when the toner-dispensing unit is made is positioned adjacent to a puncturing rod extending through the axis of the drive dog. The puncturing rod is configured to puncture the sealing element and permit toner to flow from the blow molded bottle into a conduit in the puncturing rod and eventually to a developer housing.

In a preferred embodiment, the drive dog has a circular disc-like configuration with a plurality of 6-12 mating slots and lead in chamfers positioned along a circumference of the circular or disc-like drive dog.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of constructing a toner-dispensing unit which comprises:

blow molding a one-piece toner bottle container, said bottle having integral therewith at least two molded tabs, said tabs integral with a main molded body of said bottle and blow molded into a specific shape with unique tabs for each product machine series, providing a drive dog having a plurality of mating slots with lead-in chamfers, said chamfers and slots configured to mate with said unique tabs, and mating said toner bottle to slots of said drive dog by engaging said unique tabs into said chamfers.

2. The method of claim 1 wherein said unique tabs are positioned on an insertion end of said toner bottle container that engages said drive dog.

3. The method of claim 1 wherein each of said at least two molded tabs and each of said mating slots and chamfers are configured to be unique for each specific product machine, and wherein said bottle will not fit in engagement with other products than said specific product.

4. The method of claim 1 wherein there are from 6-12 slots with lead-in chamfers in said drive dogs configured so that said bottle is not required to rotate more than about 15°-30° to locate in said slots when installed therein.

5. The method of claim 1 wherein said drive dog has 12 slots and said toner bottle has 2 tabs each, said tabs and said slots configured to mate with each other.

6. The method of claim 1 wherein said bottle has a sealing element that seals a toner discharge port, said element located at an insertion-end terminal portion of said bottle, said sealing element configured to be pierced so that toner may flow out of said bottle through said toner dispensing unit.

7. The method of claim 1 wherein said at least two molded tabs are positioned along a circumference of a sealing element positioned at an insertion-end portion of said toner bottle.

8. A method of constructing a toner dispensing unit which comprises:

blow-molding a one-piece toner container bottle, said bottle having integral therewith at least two molded tabs, said tabs uniquely molded into a specific shape to be useful only in a specific marking product machine series, positioning unique tabs on an insertion end of said bottle where they are placed along a circumference of an adjacent sealing element, said sealing element provided to be integral with said one-piece toner bottle and configured to be punctured to permit toner flow therethrough from said bottle, providing a drive dog having a plurality of lead-in mating chamfers and mating slots, said slots configured to mate only with said unique tabs to accommodate only said specific marking product series, engaging said tabs into said slots of the drive dog in a manner whereby toner will flow from said bottle, through an opening in said drive dog to a drop tube that opens into a developer housing.

9. The method of claim 8 wherein said unique tabs are positioned on an insertion end of said toner container bottle, said insertion end configured to engage said drive dog.

10. The method of claim 8 wherein each of said at least two molded tabs and each of said mating slots and chamfers are configured to be unique for each specific product machine, and wherein said bottle will not fit in engagement with products other than said specific product.

11. The method of claim 8 wherein there are from 6-12 slots with lead-in chamfers in said drive dogs configured so that said bottle is not required to rotate more than about 15°-30° to locate in said slots when installed therein.

12. The method of claim 8 wherein said drive dog has 12 slots and said toner bottle has 2 tabs each, said tabs and said slots configured to mate with each other.

13. The method of claim 8 wherein said sealing element is positioned adjacent to a puncturing rod extending through the axis of said drive dog, said puncturing rod configured to puncture said sealing element and permit toner to flow from said bottle into a conduit in said puncturing rod and eventually to a developer housing.

14. The method of claim 8 wherein said drive dog has a circular configuration with said plurality of mating slots and lead-in chamfers positioned along a circumference of said circular configuration, said mating slots and lead-in chamfers configured to mate with said tabs.

* * * * *